May 14, 1935.  A. GRESSNER  2,001,306
ATTACHMENT FOR SAWING TAPERED MATERIAL
Filed Dec. 10, 1932  2 Sheets-Sheet 1

INVENTOR
Albert Gressner
BY
James Harrison Bowen
ATTORNEY

May 14, 1935. A. GRESSNER 2,001,306
ATTACHMENT FOR SAWING TAPERED MATERIAL
Filed Dec. 10, 1932 2 Sheets-Sheet 2
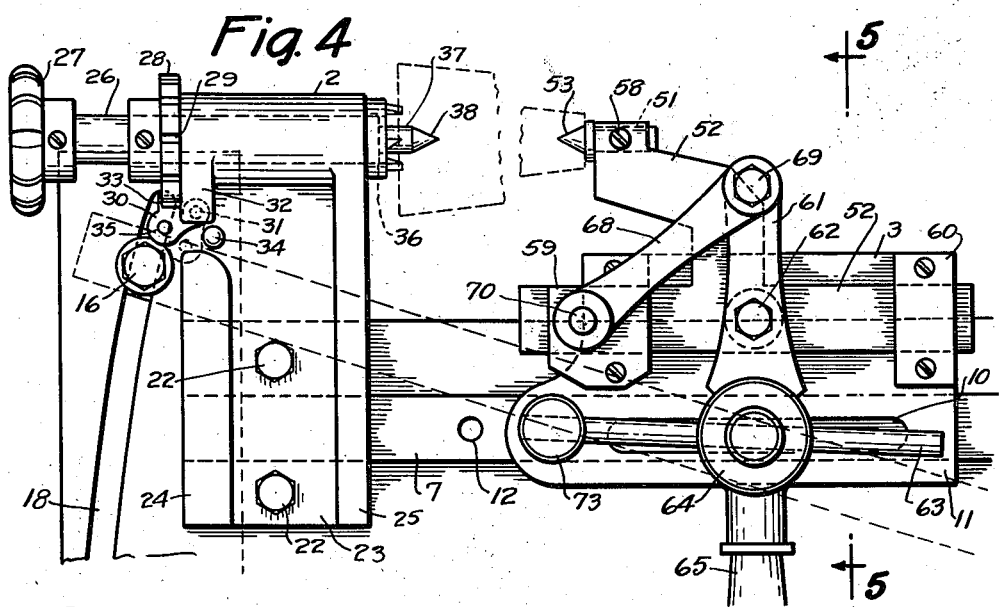
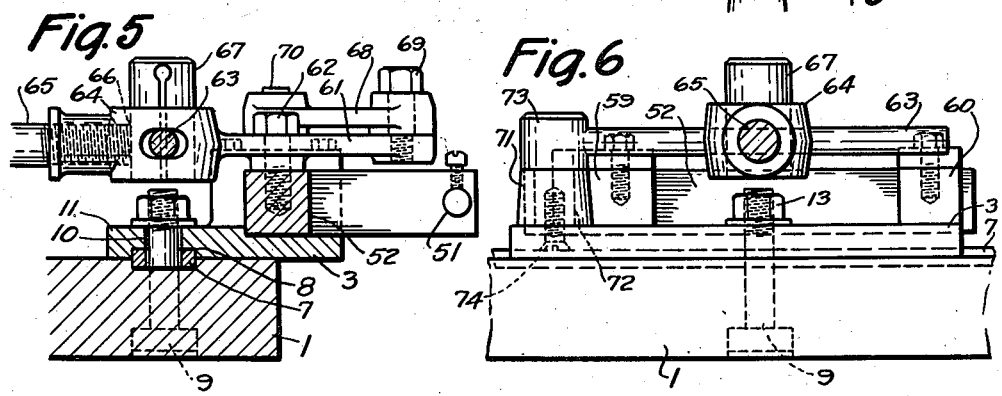
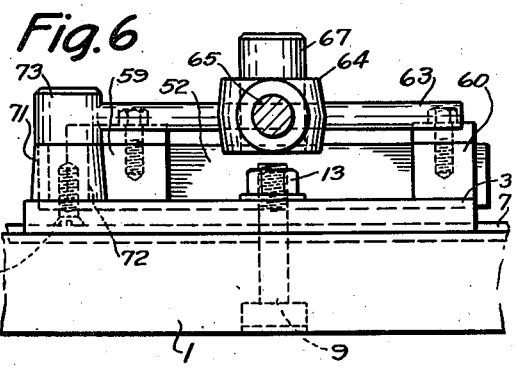
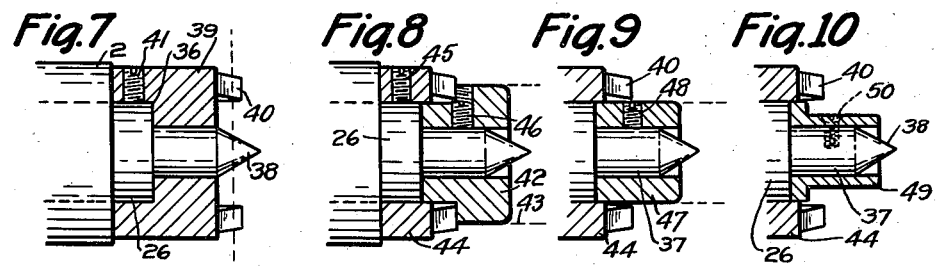
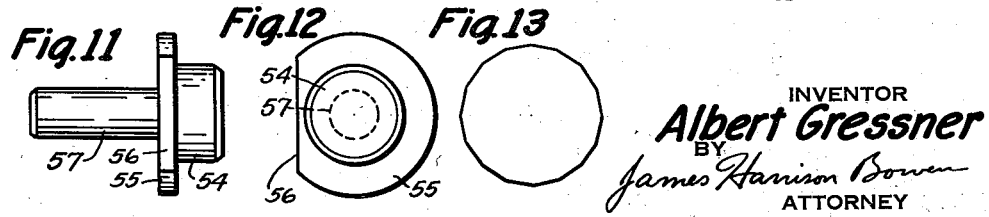
INVENTOR
Albert Gressner
BY
James Harrison Bowen
ATTORNEY Patented May 14, 1935

2,001,306

UNITED STATES PATENT OFFICE 2,001,306

ATTACHMENT FOR SAWING TAPERED MATERIAL

Albert Gressner, Flushing, N. Y.

Application December 10, 1932, Serial No. 646,691

10 Claims. (Cl. 144—138)

The invention is an attachment that may be placed on table saws for holding material so that it may be cut with one end larger than the other and with any number of sides, or substantially round.

The object of the invention is to provide an attachment for holding material so that tapered objects may be cut from the material by a saw.

Another object is to provide an attachment for table saws in which tapered material may be cut and in which the material may be cut with any number of sides.

Another object is to provide an attachment for table saws in which material may be held so that it may be cut with inclined sides in which the material may readily be removed and replaced.

Another object is to provide means for cutting tapered objects on table saws which may readily be adjusted to objects of different lengths.

Another object is to provide a sliding carriage for holding material upon table saws which may readily be locked in different positions.

A further object is to provide a device by which table and chair legs may be cut on a table saw.

A still further object is to provide a device for holding material on a table saw so that it may be cut with tapered sides in which the angle of the taper may readily be adjusted.

And a still further object is to provide an attachment for holding material on table saws so that it may be cut with tapered sides which is of a simple and economical construction.

With these ends in view the invention embodies a base having a bar adjustably held to the lower side thereof that may be placed in the groove of a table saw table, a head in which one end of the material to be cut may be held, a sliding gage adjustably mounted on the base and in which the opposite end of the material may be held, and a clamping member in the sliding gage for holding the material and locking it in the cutting position.

Other features and advantages of the invention will appear from the following description taken in connection with the drawings, wherein:

Figure 4 is a plan view showing the gage on an enlarged scale.

Figure 5 is a cross section on line 5—5 of Figure 4 showing the sliding gage.

Figure 6 is a side elevation of the sliding gage.

Figure 7 is a detail showing a collar for changing the head stock from that shown in Figure 4 in which material having a small center opening in the end thereof may be held.

Figure 8 is a similar detail showing a different collar which may be used for holding material having a larger opening in the end thereof.

Figure 9 is a similar detail showing a smaller collar for holding material having a smaller opening in the end thereof.

Figure 10 is a similar detail showing a collar for holding material having a smaller opening than may be held in the collar shown in Figure 9 and slightly larger than that that may be held in the center shown in Figure 4.

Figure 11 is a detail showing a device that may be used in the sliding gage for holding material having an opening in the end thereof in place of the center shown in Figure 4.

Figure 12 is an end view of the device shown in Figure 11.

Figure 13 is a view showing an end of a piece of material which may have been cut with sixteen sides so that it is substantially round.

Figure 1:
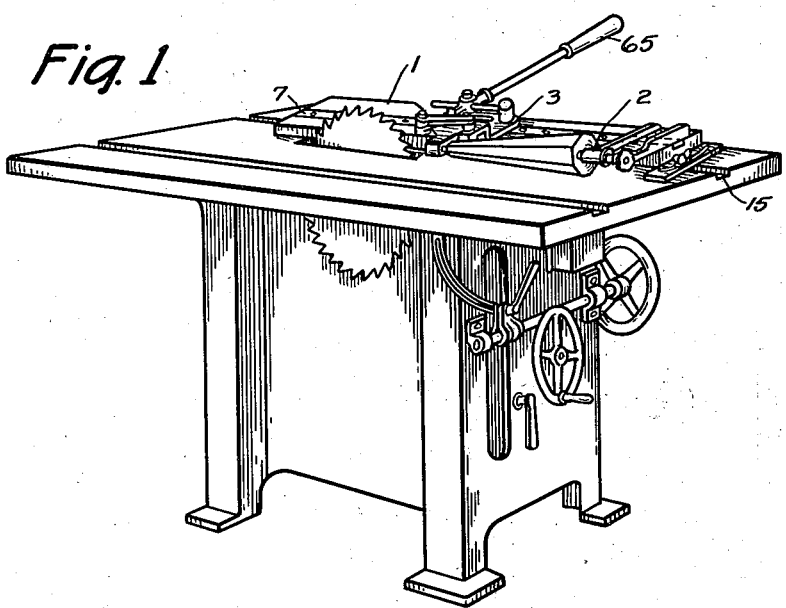
Figure 1 is a view showing a general arrangement of a table saw with the gage on the table thereof.

In the drawings the device is shown as it may be made wherein numeral 1 indicates the base, numeral 2 the head stock, and numeral 3 a gage which may be termed a sliding gage and which performs a function similar to the tail-stock of a lathe.

Figure 2:
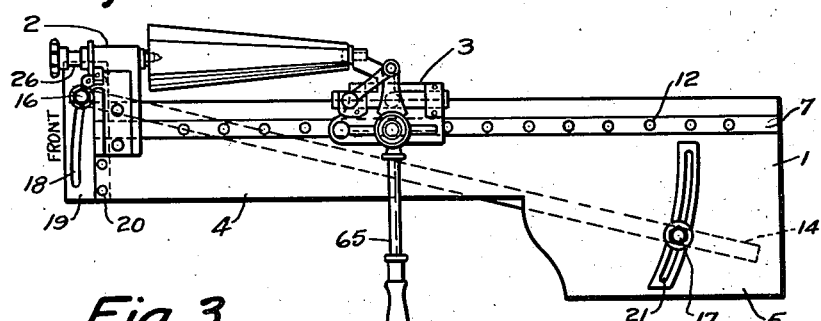
Figure 2 is a plan view showing the complete gage.
Figure 3:
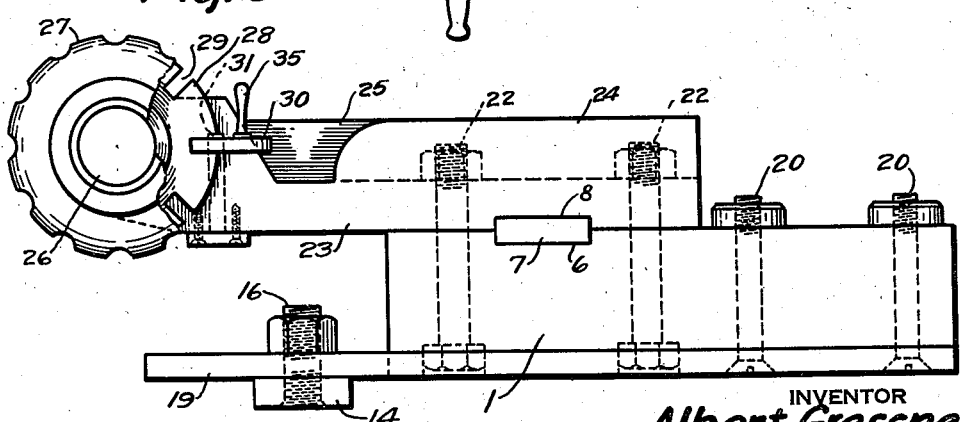
Figure 3 is an end elevation looking toward the head of the gage.

The base 1 is preferably made of a flat board, however, it may be made of any material and arranged in any shape. In the design shown it is formed with a narrow portion 4 at the front or head stock end and a substantially wide portion 5 at the opposite end. The relative width of the two parts may be changed as may be desired. The outline of this board is shown in Figure 2 and the front end thereof is shown in Figure 3. It will be noted that the upper surface of the base 1 is provided with a continuous longitudinal recess 6 in which a guide bar or track 7 may be placed which extends upward above the surface of the board and it will be noted that the gage 3, which is also provided with a recess 8 that fits over the bar 7, is held to the bar and to the base 1 by a bolt 9, which extends thru a slot 10 in the base 11 of the gage, as shown in Figures 4, 5 and 6. The bar 7 and base 1 may be provided with a plurality of openings 12, as shown in Figure 2, so that the bolt 9 may readily be placed thru any one of these openings to change the position of the gage 3. It will be noted that the position of the gage may be changed a comparatively short distance as by loosening a nut 13 on the bolt 9 the gage may be moved backward and forward on the bar 7 as the bolt is free to move in the slot 10.

On the lower side of the base is a bar 14 the position of which may readily be adjusted to change the angle of the base in relation to the table. This bar may be of any size and may be changed for different saws so that it will correspond with a groove 15 in the saw table, as shown in Figure 1. It is understood that these grooves may be of different sizes so that the device may be provided with a bar of any size to correspond with the groove of the saw table. This bar is held to the base by bolts 16 and 17, as shown in Figure 2, and the bolt 16 is held in a slot 18 in a plate 19 that extends from the forward edge of the base, as shown in Figures 2 and 3, and it will be noted that the bolt may be moved backward and forward in the slot 18 to change the position of the base. The plate 19 may be held to the base by bolts 20, as shown, or by any other means, and it will be noted that the inner edge thereof is recessed into the forward edge of the base. The bolt 17 is held in a slot 21 at the opposite end of the base and it will be noted that this bolt may also be adjusted to change the position of this end of the base.

The head 2 is positioned on the front of the base and is held thereto by bolts 22, as shown in Figures 2 and 3. The head is provided with a base 23 having flanges 24 and 25 at the edges and the head 2 is formed of a cylindrical shape at the outer end of the base. The head is provided with a spindle 26, as shown in Figure 4, and at the outer end of the spindle is a handle 27 by which it may readily be rotated. A wheel 28 is also positioned on the spindle and this is provided with notches 29 which may be positioned at thirty or forty-five degrees, or at any number of degrees to correspond with any number of sides that one may desire to cut. It will be understood that one head may be provided with forty-five degree slots and another with thirty degree slots and the heads may readily be interchangeable as they may readily be removed and replaced by removing the nuts from the bolts 22. One head may, therefore, be set for one number of sides, and another for another number of sides and it will be understood that any number of heads may be provided, or, the wheel may be provided with any number of slots so that any number of sides may readily be cut.

A key 30 is pivotally mounted on a pin 31 in a projection 32 of the head and it will be noted that this may be moved into the position shown in full lines in Figure 4 so that a projection 33 thereof will extend into one of the notches 29 to lock the spindle and hold it in any position. When it is desired to turn the spindle the key 30 may be turned to the position shown in dotted lines where it will engage a stop 34 and after the spindle has been turned to the correct position the key may be moved back to the position shown in full lines to lock and hold the same. The key may be provided with a handle 35 by which it may readily be moved from one position to another.

The opposite end of the spindle may be provided with a shoulder 36 and a pin 37, with a point 38 at the end thereof, may extend beyond the shoulder, as shown in Figures 4 and 7. It will be noted that the shoulder 36 extends beyond the end of the head 2 and when it is desired to cut material having a small center opening in the end thereof it may be placed on the point 38; however, when it is desired to cut material having a round opening therein the opening may be placed over the pin 37. A plurality of collars and attachments may be provided, as shown in Figures 7 to 10, inclusive, to accommodate material having different size openings therein. It will be understood that these may be of any size or design and any other attachments may be used to hold material of any other type or description. It will also be understood that any other means may be used for holding material to the end of the spindle so that the material may be turned with the spindle.

In the design shown in Figure 7 a collar 39 is provided which may be used with material having a small center opening therein and it will be noted that the point 38 may be placed in the center opening and the prongs 40 on the collar 39 will be forced into the material to positively grip the same. These prongs may be of any shape or design and as many as may be desired may be provided. The collar 39 may be held to the end of the spindle 26 by a set screw 41, as shown.

In the design shown in Figure 8 a collar 42 is provided which may be used for holding material having a comparatively large opening therein, as indicated by the dotted lines 43. With this collar a comparatively short prong collar is used, which is indicated by the numeral 44, which may be held to the spindle by a set screw 45, and it will be noted that the material will fit over the collar 42 and engage the prongs on the collar 44. The collar 42 may also be provided with a set screw 46 by which it may be held to the pin 37. The collar shown in Figure 9 is similar to that shown in Figure 8 except that it is of a small diameter and may be used for material having a smaller opening therein. The short collar 44 is used with this collar, which is indicated by the numeral 47, and it may also be held by a set screw 48. Figure 10 also shows a similar design in which a collar is used for material having a still smaller opening and in this design the outer portion of the collar, which is indicated by the numeral 49, is turned down and a set screw 50 is screwed into the pin 37. It will also be understood that any other means may be used for holding the collars on the spindles.

A plurality of attachments, as shown in Figures 11 and 12, may also be provided to hold the opposite end of the material and these may be held in an opening 51 in a member 52 which is slidable in the gage 3. These attachments may be provided with a point 53, as shown in Figure 4, or may have a circular plug 54, as shown in Figure 11. A flange 55 may be provided at the base of the point or plug and this may have a flat side 56, as shown in Figure 12, which may be positioned at the outer edge so that it will be possible for the cutting tool to pass very close to the center. These points or plugs are provided with a shank 57 which is held in the opening 51 by a set screw 58, as shown.

The member 52 is slidably mounted in the gage 3 and the ends thereof are slidably held in bearings 59 and 60. The bearings 59 and 60 are formed at the opposite ends of the member 3 with square openings corresponding with the ends of member 52, and these openings are closed by cover plates, as shown in Figure 4. This member may be moved backward and forward by a lever 61 which is pivotally attached to the member 52 by a bolt 62, as shown in Figures 4 and 5, and the lever 61 is slidably mounted on a pin 63 thru a hub 64 and at the outer end of the hub is a handle 65 by which the lever may readily be moved to adjust the position of the member 52. It will be noted in Figure 5 that the handle 65 is threaded into the hub 64 and the end 66 thereof engages a split pin 67 thru which the pin 63 passes and it will be noted that as the handle 65 is screwed inward it will bind the pin 67 upon the pin 63 and thereby lock the hub 64 of the lever 61 on the pin. When it is desired to move the member 52 the handle 65 may be unscrewed so that the hub will be free to move back and forth on the pin. The opposite end of the lever 61 is pivotally attached to a link 68 by a bolt 69 and the opposite end of the link 68 is pivotally attached to the bearing 59 of the base of the gage 3 by a pin 70. This means of mounting both ends of the lever 61 makes it possible for the point of the lever at which it is attached to the member 52 by the bolt 62 to travel back and forth in a straight line so that the member 52 may be moved without binding in the bearings. The pin 63 is mounted in a post 71 thru a pin 72 having a head 73 thereon in which the pin 63 is held. The pin 72 is free to rotate in the post 71 and is held downward therein by a screw 74 which extends upward into the lower end thereof from the base of the gage 3. It will be understood that this pin may be mounted in any other manner and also that the lever 61 may be mounted and arranged in any other manner.

It will be understood that other changes may be made in the construction of the device without departing from the spirit of the invention. One of which changes may be in the use of other means for holding material in the head or gage, another may be in the use of other means for adjusting the position of the gage or tail-stock, another may be in the use of other means for locking the gage in different positions, another may be in the use of other means for mounting the head or gage on the base, another may be in the use of other means for holding the spindle of the head stock in different positions, and still another may be in the use of other means for adjusting the position of the base on the table of the saw.

The construction will be readily understood from the foregoing description. In use the device may be provided as shown and it will be noted that it may readily be mounted on a table of a circular saw by placing the member 14 in the slot 15 of the saw table. The device will then be free to move backward and forward past the saw. Material to be cut may then be placed in the device and held between the head stock and gage, as shown in Figures 1 and 2. The spindle may be set to one of any desired number of sides. The entire device may then be moved past the saw so that one side will be cut and then it may be returned, the position of the material turned to the next side by the spindle, and then run by the saw again. This operation may be continued as many times as may be desired to cut as many sides as desired. When all sides of the material are cut the handle 65 may be released so that the member 52 may be moved away from the end of the material and then the material may be removed and replaced by another piece of material. It will be noted that the bevel of the material may readily be changed by the bolts 16 and 17 so that it will be possible to cut material with any slope desired. As one side of the flange 55 is flat, material may be cut to a very small diameter and the length may vary from two or three inches to thirty-six inches or to any length.

By increasing the number of sides it is also possible to cut material substantially round as, as shown in Figure 13, the material is cut with sixteen sides and it will be noted that the corners are very slight and it is only necessary to run a piece of sandpaper over the material to make it round. The number of sides may be increased or decreased and it will be appreciated that by increasing the number of sides it will be possible to cut the material substantially round, or, as may be desired. The attachment is particularly adapted for table and chair legs and also for bannister columns; however, it may be used for cutting material of any type or design and for any purpose. It may also be used for wood, paper or material of any composition, or for any kind of material.

This attachment has been shown and described as particularly adaptable for circular or table saws in which the material may be cut directly by the saw. It will also be understood that the attachment may be applied to a shaper, or any other machine tool, and may also be used for fluting, beading, or any other purpose. The tools used for fluting and beading are not uncommon in the art and any arrangement of cutting knives or tools may be used. These knives or tools may be held upon the shaper spindle similar to the manner in which the saw is held upon the spindle of the table saw and the attachment may be slidably mounted upon the table of the shaper, or other tool, in the same manner in which it is mounted upon the table saw. The attachment may, therefore, be used as a unit independent of the table saw, or any tool, and may be applied to any tool or device and operated in the same manner, as hereinbefore described, for the saw.

Having thus fully described the invention, what I claim as new and desire to secure by Letters Patent, is:

1. A work holding attachment comprising a flat bed plate, a bar extending longitudinally of said bed plate and positioned on the lower side thereof, said bar adjustably held in curved slotted openings in the opposite ends of said bed plate, another bar partially embedded in the upper surface of said bed plate and extending longitudinally thereof, a head stock mounted at one end of said bed plate and extending over the edge thereof, a tail stock slidable on the upper surface of said bed plate and keyed to the bar embedded in said upper surface, means fixedly holding said tail stock in different positions upon said bar, opposed holding means in said head and tail stocks for holding objects therebetween, said holding means in the tail-stock being movable and means for withdrawing said holding means in said tail stock from its engagement with the object held.

2. In an attachment as described in claim 1, means locking the holding means in said tail stock in different positions.

3. In an attachment as described in claim 1, means in said head stock for turning the object to a plurality of positions, and means locking said head stock in each of the different positions.

4. In combination a head stock, a slidable tail stock, work holding means slidably mounted on said tail stock, a bed upon which said head and tail stocks are mounted, a guide on said bed fitting into a groove in said tail stock, means locking said tail stock on said guide at a plurality of points, a key on the lower surface of said bed adapted to hold said bed in sliding engagement with a groove in a table upon which it may be placed, and a readily releasable handle in said tail stock adapted to move said work holding means for releasing work held between said head and tail stocks when moved in one direction and for engaging work by the said head and tail stocks when moved in the opposite direction, and also adapted to lock the tail stock when the handle is turned.

5. In a combination as described in claim 4, means adjusting the position of said key.

6. In a combination as described in claim 4, means holding the ends of said key in curved slots adjacent the ends of said bed.

7. In an attachment for holding objects for tapered cutting thereof, a bed plate, adjustable means on the lower surface of said bed plate adapted to hold said bed plate in slidable engagement with a grooved table, a head stock at one end of said bed plate, a tail stock slidable on said bed plate, means holding said tail stock in a plurality of fixed positions on said bed plate, a bar slidable in said tail stock, tool holding means extending from one side of said bar, a horizontal rod pivotally mounted at one end on said tail-stock, a lever mounted on said tail stock and slidable on said horizontal rod, and means pivotally attaching said lever to said slidable bar.

8. In an attachment as described in claim 7, a handle by which said lever may be operated, and means locking said lever thru said handle.

9. In an attachment as described in claim 7, a handle by which said lever may be operated, and said handle threaded in said lever and adapted to be turned to lock or release said lever on said rod.

10. The combination with a work holding tool adapted to be clamped in different angular positions in relation to a cutting tool and moved backward and forward past said cutting tool to cut work held therein at an angle in relation to the axis of said work; of a head stock mounted upon said work holding tool, a tail stock slidably mounted on said work holding tool, means to independently clamp said tail stock in different positions on said work holding tool, a work engaging member slidable in said tail stock, a rotary handle to move said member to engage or disengage work between the said head stock and tail stock and means to clamp said work engaging member in any position of adjustment by turning said handle.

ALBERT GRESSNER.